US008090155B2

(12) United States Patent
Lacey et al.

(10) Patent No.: US 8,090,155 B2
(45) Date of Patent: Jan. 3, 2012

(54) HAND WASHING MONITORING SYSTEM (75) Inventors: Gerard Lacey, Wicklow (IE); David Fernandez Llorca, E-Madrid (ES)

(73) Assignee: Provost Fellows and Scholars of the College of the Holy and Undivided Trinity of Queen Elizabeth Near Dublin, Dublin (IE)

( * ) Notice: Subject to any disclaimer, the term of this patent is extended or adjusted under 35 U.S.C. 154(b) by 698 days.

(21) Appl. No.: 12/226,983

(22) PCT Filed: May 4, 2007

(86) PCT No.: PCT/IE2007/000051
§ 371 (c)(1),
(2), (4) Date: Nov. 4, 2008

(87) PCT Pub. No.: WO2007/129289
PCT Pub. Date: Nov. 15, 2007

(65) Prior Publication Data
US 2009/0087028 A1   Apr. 2, 2009

(30) Foreign Application Priority Data

May 4, 2006   (IE) .................................... 2006/0350
Dec. 12, 2006   (IE) .................................... 2006/0905

(51) Int. Cl.
G06K 9/00 (2006.01)
G06K 9/34 (2006.01)
G06K 9/62 (2006.01)
H04N 5/228 (2006.01)

(52) U.S. Cl. ........ 382/107; 382/100; 382/103; 382/151; 382/173; 382/209; 348/208.14

(58) Field of Classification Search .................. None
See application file for complete search history.

(56) References Cited

U.S. PATENT DOCUMENTS

| 5,952,927 | A | 9/1999 | Evans et al. |
| 6,236,317 | B1 | 5/2001 | Cohen et al. |
| 6,426,701 | B1 | 7/2002 | Levy et al. |
| 6,970,574 | B1 * | 11/2005 | Johnson .................. 382/100 |
| 7,542,586 | B2 * | 6/2009 | Johnson .................. 382/100 |

FOREIGN PATENT DOCUMENTS

| GB | 2 337 327 | 11/1999 |
| JP | 2006-132277 | 5/2006 |
| WO | WO 98/36258 | 8/1998 |
| WO | WO 03/079278 | 9/2003 |
| WO | WO 2005/093681 | 10/2005 |

OTHER PUBLICATIONS

International Search Report dated Jul. 10, 2007.

* cited by examiner

*Primary Examiner* — Tom Y Lu
*Assistant Examiner* — Thomas Conway
(74) *Attorney, Agent, or Firm* — Jacobson Holman PLLC (57) ABSTRACT

A hand washing monitoring system (1) comprising a camera (2), a processor (4), the processor being adapted to receive from the camera images of hand washing activity. The processor analyses mutual motion of hands to determine if the hands mutually move in desired poses, and if so, the durations of the patterns; and generates a hand washing quality indication according to the analysis. The processor extracts information features from the images and generates feature vectors based on the features, including bimanual hand and arm shape vectors, and executes a classifier with the vectors to determine the poses. The processor uses edge segmentation and pixel spatio-temporal measurements to form at least some of the feature vectors.

37 Claims, 7 Drawing Sheets

HAND WASHING MONITORING SYSTEM

This is a national stage of PCT/IE07/000,051 filed May 4, 2007 and published in English, which has a priority of Irish no. 2006/0350 filed May 4, 2006 and a priority of Irish no. 2006/0905 filed Dec. 12, 2006, hereby incorporated by reference.

INTRODUCTION

1. Field of the Invention

The invention relates to monitoring of hand washing.

2. Prior Art Discussion

It is well known and documented that transmission of infection in environments such as hospitals and kitchens due to incorrect hand washing is widespread, has a major detrimental effect on health, and a huge financial cost.

In both healthcare and food preparation environments training is given in hand washing techniques. While there is a recognized problem to encourage people to wash their hands in the first place, it is also critical that they do so in an effective manner—by following the guidelines. It has been shown that particular areas of the hand are frequently missed with hand washing—notably the tips of fingers and the thumbs. Fingers are thought to be the most important part of the hand in terms of the transfer of pathogenic mirco organisms.

While the recommended time for hand washing is a minimum of 15 seconds of hand rubbing, studies have shown that both long (3 mins) and short (10 seconds) can produce a ten fold reduction in the median number of transient bacteria and suggests that hand washing technique is more important than duration.

A recommended technique for hand washing consists of the following phases:

1. Apply soap, wet hands and rub palms together.
2. Rub right palm over the back of the left hand up to wrist level, and do the same with the other hands.
3. With the right hand over the back of the left hand rub the fingers, do the same with the other hand.
4. Rub palm to palm with the fingers interlaced.
5. Wash the thumbs of each hand separately.
6. Rub the tips of the fingers against the opposite palm.
7. Rinse hands thoroughly removing all traces of soap.
8. Dry hands (without touching the taps).

WO03/079278f describes a system which executes a pattern recognition algorithm with digitized images to generate a pass/fail report for hand washing or disinfectant application.

WO2005/093681 describes a cleanliness monitoring system and method involving a fluorescent tracer, a UV irradiation source, and determining the proportion of the hands which are clear of tracer.

GB2337327 describes pixel-by-pixel analysis of soap on hands, and WO98/36258 also describes an approach involving pixel analysis to detect soap on hands.

U.S. Pat. No. 5,952,924 describes an RFID badge to trigger measurement of hand washing. A motion sensor is used to trigger the device and an alcohol sensor is used to detect if hand washing occurs.

U.S. Pat. No. 6,236,317 describes an RFID-based tracking system to ensure that people wash their hands when entering and leaving defined zones such as toilets and raw meat counters. IR reflection sensors are used to localise the user in front of the sink.

U.S. Pat. No. 6,426,701 describes use of audio visual feedback to guide the user through hand washing. Proximity sensors are used to ensure that the user's hands have remained in the sink for 20 seconds.

While various techniques have been described in the art it appears that they suffer from not analysing the hand washing in a very comprehensive manner.

The invention is directed towards achieving improved monitoring of hand washing.

SUMMARY OF THE INVENTION

According to the invention, there is provided a hand washing monitoring system comprising a camera, a processor, the processor being adapted to receive from the camera images of hand washing activity, characterized in that, the processor is adapted to:

analyse mutual motion of hands to determine if the hands mutually move in desired poses, and if so, the durations of the patterns; and generate a hand washing quality indication according to the analysis.

In one embodiment, the processor analyses the images within a region of interest encompassing joined hands.

In another embodiment, the processor generates the indication independently of the order of motion poses.

In a further embodiment, the processor extracts information features from the images and generates feature vectors based on the features, including bimanual hand and arm shape vectors, and executes a classifier with the vectors to determine the poses.

In one embodiment, the processor uses edge segmentation to form at least some of the feature vectors.

In another embodiment, the processor uses pixel spatiotemporal measurements to form at least some of the feature vectors.

In a further embodiment, the processor decomposes an image into cells and uses each cell to calculate a histogram, and combines the histograms to form a feature vector.

In one embodiment, the processor generates the feature vectors using rules derived from a training phase performed with reference images.

In another embodiment, the processor reduces size of the feature vectors.

In a further embodiment, the processor reduces feature vector size using Principal Component Analysis.

In one embodiment, the processor uses linear discriminate analysis to reduce feature vector size.

In another embodiment, a self-organising map is generated to represent clustered datasets of a reduced feature vector.

In a further embodiment, the processor classifies the feature vectors by executing a multi-class classifier which is trained with exemplar feature vectors to generate an estimate of a hand pose.

In one embodiment, the processor performs the classification using a support vector machine.

In another embodiment, the processor executes an ensemble of support vector machines.

In a further embodiment, the processor determines a pose according to votes from different support vector machines.

In one embodiment, the processor filters bimanual hand pose classifications.

In another embodiment, the processor performs said filtering by using probabilistic bimanual hand motion models to remove anomalous results.

In a further embodiment, the processor determines a time duration for a pose by registering a count of the number of image frames for a pose.

In one embodiment, the processor assigns a minimum threshold for each pose.

In another embodiment, the processor is calibrated for light level and/or colour changes in an image normalisation process.

In a further embodiment, the processor performs segmentation according to colour, texture and/or motion to avoid noise arising from reflections.

In one embodiment, the processor eliminates pixels representing watches or jewelry according to region size and shape analysis.

In another embodiment, the system is battery powered.

In a further embodiment, the classifier comprises an ensemble of weak classifiers.

In one embodiment, the processor, before feature extraction, detects skin by normalizing pixel colour values to skin and non-skin class bins, and processes bin counts to determine skin probability values.

In another embodiment, the processor executes a lighting compensation filter operating on the basis that the spatial average of surface reflectance in a scene is achromatic.

In a further embodiment, the processor performs optical flow calculations based on pixel distance moved and direction of movement, and applies motion data to a filter to eliminate skin false-positive pixels.

In one embodiment, the processor determines increase and decrease factors representing pixel motion increase and decrease, and applies a greater weighting to motion than absence of motion.

In another embodiment, the processor performs hand and arm detection by monitoring geometric characteristics of pixel blobs, including major and minor axes.

In a further embodiment, the processor performs feature extraction by generating histograms of gradient orientation in a local part of an image by accumulating votes into each of a plurality of bins, each for an orientation.

In one embodiment, the processor generates a gradient orientation histogram for each of a plurality of pixel cells comprising pre-defined numbers of pixels.

In another embodiment, the processor concentrates all histograms into a single vector.

In a further embodiment, the processor normalizes cell histograms.

In one embodiment, the processor performs a training phase in which vectors are generated from training images.

In another aspect, there is provided a soap dispensing unit comprising a monitoring system as defined above.

In a further aspect, there is provided a computer readable medium comprising software code for performing operations of a processor of a monitoring system as defined above.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
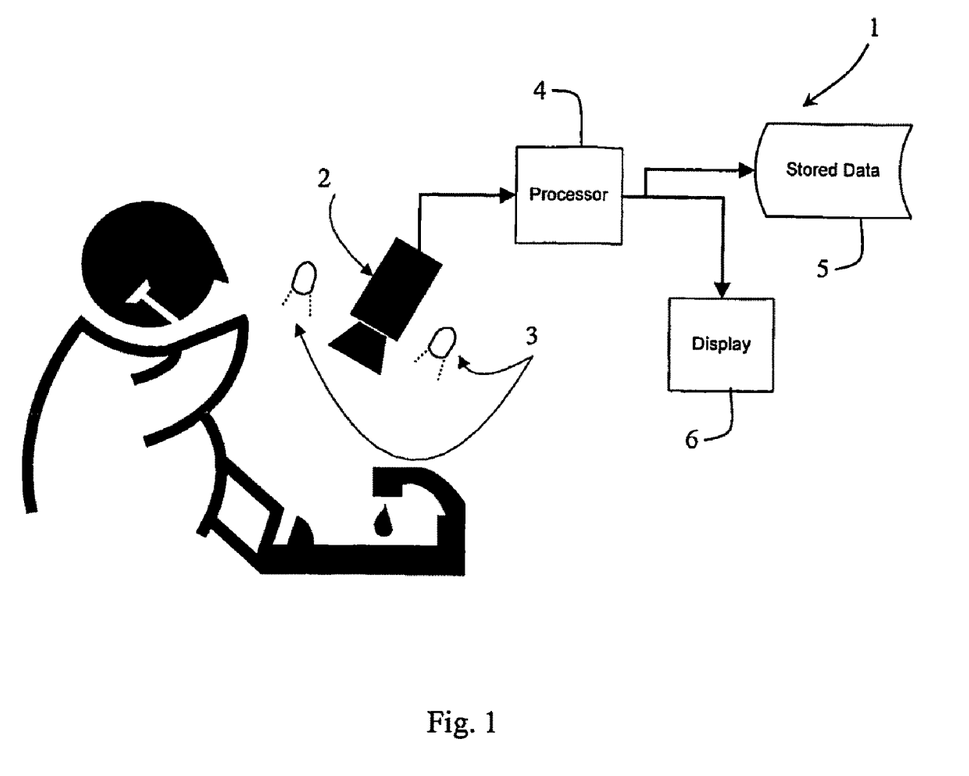
FIG. 1 is a high-level representation of a monitoring system of the invention.

Referring to FIG. 1 a monitoring system 1 comprises a camera 2, an illuminator 3, a processor 4, a storage device 5, and a display 6. The camera 2 captures images of handwashing activity and these images are processed by the processor 4 to determine if the desired hand motions have taken place by using motion tracking techniques.

The system 1 tracks the hand motions and classifies the type of motion pattern used by performing the following steps:

Detection of the hands.

Detection if the hands are joined.

Creating a region of interest around the joined hands.

Extracting edge and region information for the hands within the region of interest to provide feature vectors.

Classifying the bimanual hand motion information (in the form of the feature vectors) using a multi-class classifier such as an ensemble of Support Vector Machine (SVM) or a cascade of weak classifiers to determine if the hands are in one of the different hand washing motions.

Ensuring that each of the steps of the hand washing have been achieved for the desired amount of time. The sequence of the washing steps is not important. What is important is the set of bimanual hand motions performed.

The camera 2 captures images, and the processor 4 analyses the images to analyse bimanual hand washing motions to check if all of the required steps of hand washing have been adequately completed.

The image processing information is used to determine if the hands are moved in predetermined patterns, that the patterns are each executed for a minimum length of time, and that all required patterns in the hand washing procedure are executed.

Figure 2:
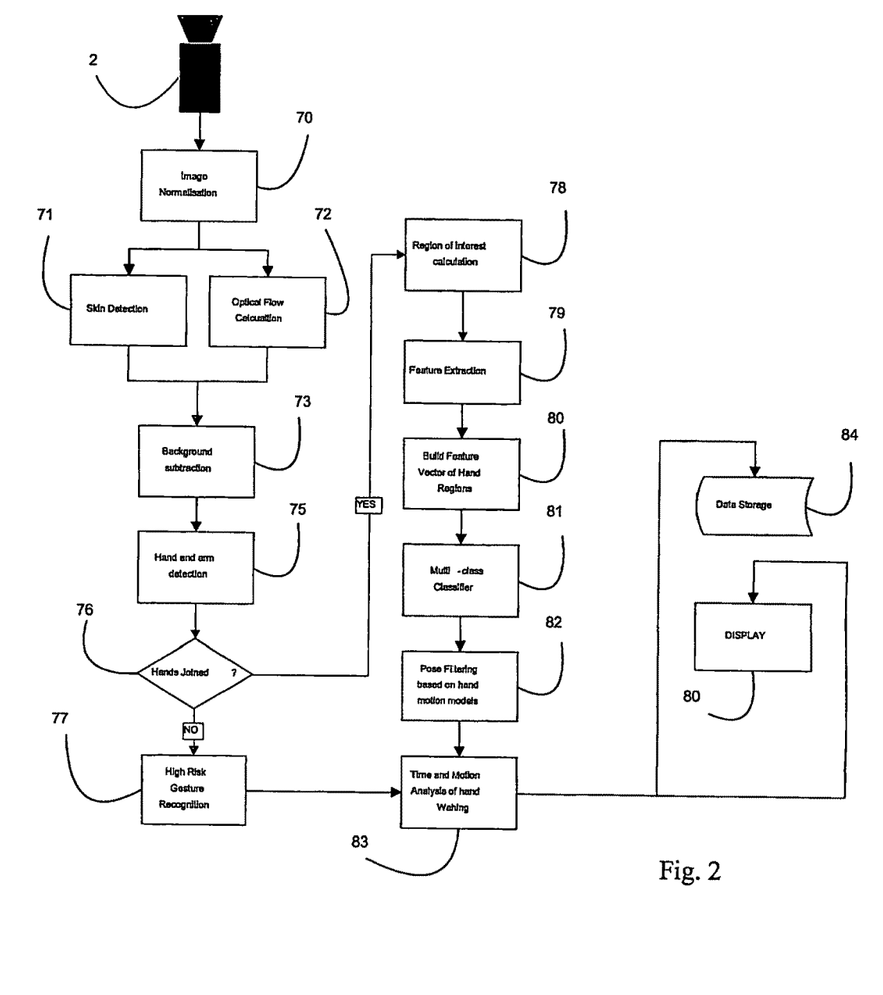
FIG. 2 is a flow diagram showing operation of the system.

The following describes the method in more detail, with reference to the steps of FIG. 2 and also to FIGS. 3-12.

Image Normalisation, 70

In this step the brightness, colour balance, and contrast of the image are modified on the basis of parameters measured during a set-up phase. A typical example of this is to determine the white balance of the camera by the camera capturing an image of a pure white card and associating the values it reads with pure white.

Figure 3:
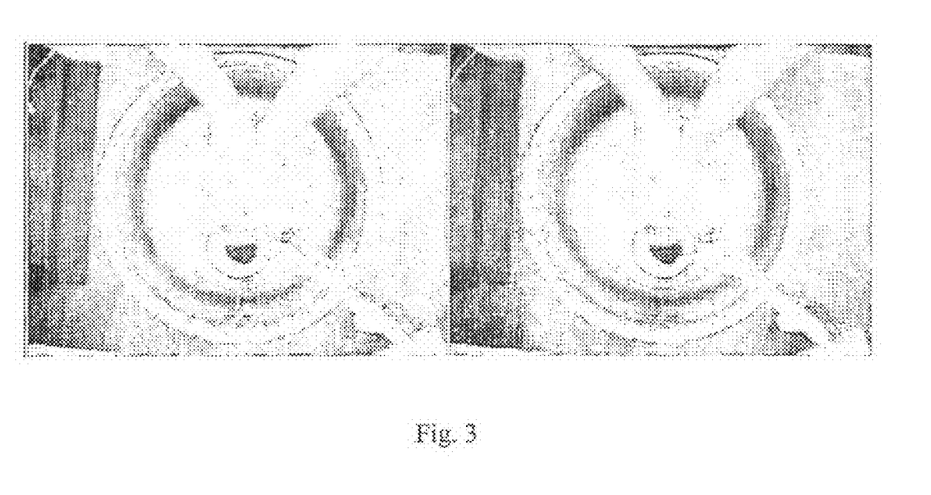
FIG. 3 shows, left, an original image and, right, a compensated image with a standard mean of 97.

Lighting compensation or color constancy algorithms are used. A greyworld algorithm is used in one embodiment. It is based on the assumption that the spatial average of surface reflectance in a scene is achromatic. Since the light reflected from an achromatic surface is changed equally at all wavelengths, it follows that the spatial average of the light leaving the scene will be the color of the incident illumination. The grey-world algorithm is defined as, $$B_C = \frac{B_{std}}{B_{avg}}; \quad G_C = \frac{G_{std}}{G_{avg}}; \quad R_C = \frac{R_{std}}{R_{avg}} \quad (1)$$

where $BGR_C$ is the scale factor for every channel. $BGR_{avg}$ is mean values of the specific channel in a specific frame. $BGR_{std}$ is the 50% ideal grey under the canonical, i.e. the $BGR_{avg}$ given by $BGR_{avg}=\frac{1}{2}BGR_{canonical}=\frac{1}{2}256=128$. The limitation of the grey-world algorithm is that the constant standard mean value (128) will not fit well for images with a dark background, which will be over-compensated. The processor computes the standard mean value as:

$$C_{std} = \frac{\sum_{i=1}^{m}[mas(B_i, G_i, R_i) + \min(B_i, G_i, R)]}{2xn} \quad (2)$$

$$n = m - \sum_{i=1}^{m}(B = G = R = 0) \quad (3)$$

where m stands for the number of pixels in the image and n stands for the number of non-black pixels in the image. Thus the over-compensation problem is solved. By calculating the average of the maximum and minimum channel percentage, an adaptive mean gray value of the whole image is obtained. The $BGR_{avg}$ is the mean of the non-black pixels in each channel. The scale factor $S_C=C_{std}/BGR_{avg}$ is applied for all pixels in the image.

Skin Detection, 71

Using a skin detector such as a Poesia™ filter identify the regions of the image that can be classified as skin. Sometimes reflections from specular surfaces such as stainless steel sinks will also be classified as skin using this method.

Non-parametric skin modeling with Bayesian models based on histograms is applied. The skin and non-skin colors are modelled through histograms. The color space RGB is normalized to a number of bins rgb $\in$RGB and the processor counts the number of color pixels in each bin $N_{skin}$ (rgb) for skin class as well as $N_{nonskin}$ (rgb) for non-skin class. Finally, each bin is normalized to get the discrete conditional skin/non-skin color distribution p(rgb|skin)/(rgb|nonskin). Letting TS and TN denote the total counts contained in the skin and non-skin histograms, i.e., the number of skin and non-skin pixels in the training set, we have:

$$P(rgb/\text{skin}) = \frac{N_{skin}(rgb)}{T_S}; \quad P(rgb/nonskin) = \frac{N_{nonskin}(rgb)}{T_N} \quad (4)$$

As well as the priors:

$$P(\text{skin}) = \frac{T_S}{T_S + T_N}; \quad P(nonskin) = \frac{T_N}{T_S + T_N} = 1 - P(\text{skin}) \quad (5)$$

Then the Bayesian formula is employed to estimate the skin/non-skin probability-according to the color of a given pixel:

$$P(nonskin \mid rgb) = \frac{p(rgb \mid \text{skin})p(\text{skin})}{p(rgb \mid \text{skin})p(\text{skin}) + p(rgb \mid nonskin)p(nonskin)} \quad (6)$$

$$P(nonskin \mid rgb) = 1 - p(\text{skin} \mid rgb) \quad (7)$$

Skin and non-skin reference histograms were obtained from the open source filtering according to the Poesia project. The project has compiled 323 3D RGB histograms from the Compaq database and has left them available in two files, one for skin pixels and other for non-skin pixels. Prior probabilities of skin and non-skin are assumed to be 0.4 and 0.6 respectively. After applying equation (6) the skin detection results in a skin probability map Xp(i, j). A skin binary map Xb(i, j) can be made upon a properly selected threshold Th, 0<Th<1. The pixel is said to be a skin pixel if p(skin/rgb)>Th, or a non-skin pixel if p(skin/rgb)"Th.

Optical Flow Calculation, 72

This determines the way that pixels move from one image to the next. The movement at each pixel is represented as distance moved and a direction of movement. As the hands are the primary moving object in the scene they will produce the primary optical flow vectors. Reflections and water can also produce optical flow measurements. Motion information is calculated using dense optical flow measurements using the Lucas Kanade method. Coarser methods such as block matching do not provide sufficient per-pixel information to produce a reliable segmentation.

Background Subtraction, 73

Figure 4:
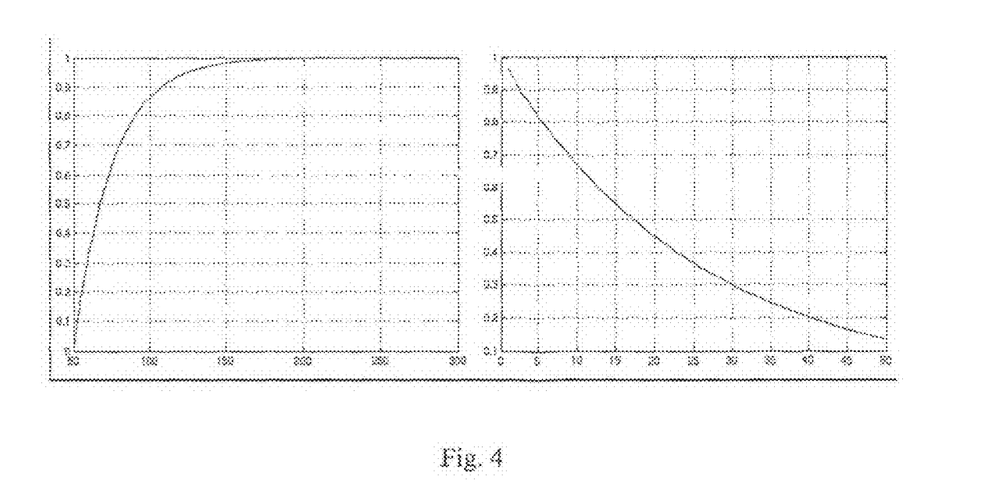
FIG. 4 shows motion (left) increase and (right) decrease functions with a threshold $T_{ID}=50$.

In order to have a robust segmentation process motion information is also used. The technique consists in computing an averaged image integrating both skin and motion features. For each skin pixel, which could be a false positive, the processor measures the motion, after applying an average filter over the motion magnitude image. If the averaged motion magnitude is greater than a fixed threshold $T_{ID}$ the probability is increased. If it is less than $T_{ID}$, then the probability is decreased. The increase and decrease values are computed according to the following equations:

$$I = I_F\left(1 - \frac{1}{\exp\left(\frac{M_t - T_{ID}}{0.5\, T_{ID}}\right)}\right) \quad (8)$$

$$D = D_F \frac{1}{\exp\left(\frac{M_t}{0.5\, T_{ID}}\right)} \quad (9)$$

where $I_F$ and $D_F$ are the increase and decrease factors with which the processor tunes how fast or slow the variations are when there were motion or not, $M_i$ is the motion magnitude of pixel i, and $T_{ID}$ is the threshold value which decides if there is going to be an increase or a decrease in the output image. In FIG. 4 the increase and decrease functions are depicted for a threshold $T_{ID}=50$. The increase function reaches the maximum value quickly, whereas the decrease function is less steep. This is because to stress quickly the motion when it appears and penalize the absence of motion in a slower way.

Thus skin pixels due to metal sinks and specular reflections, are removed while the hands/arms are correctly segmented only if they are moving.

Figure 5:
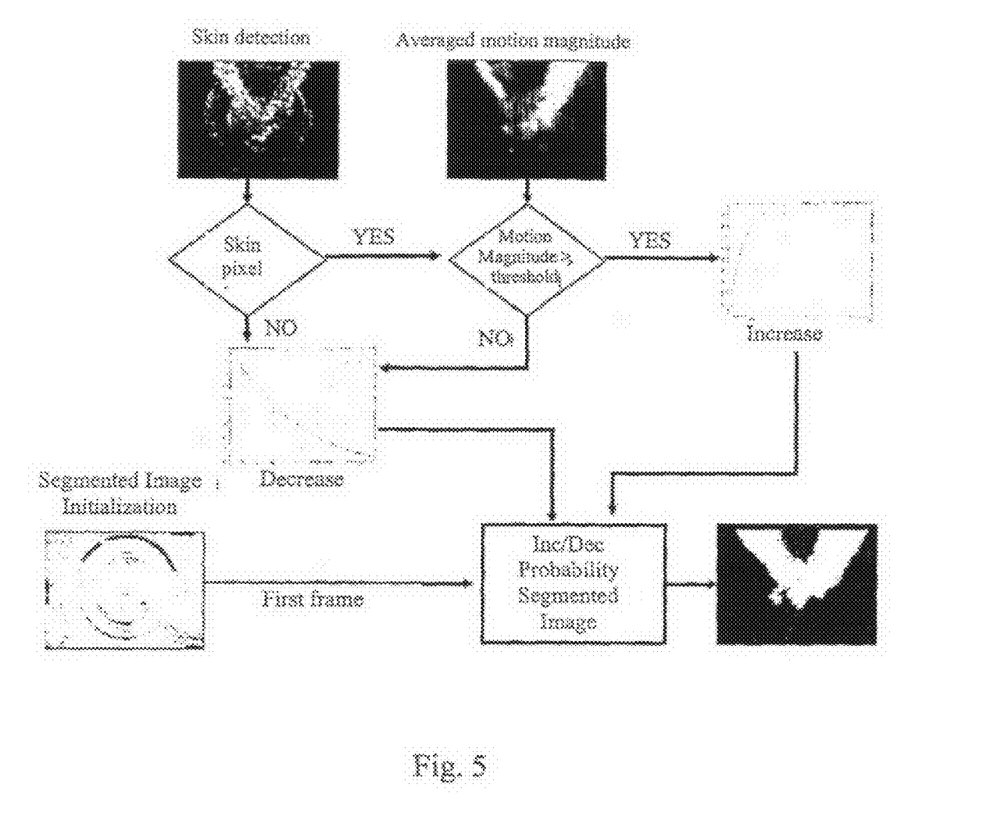
FIG. 5 shows skin and motion detection for a hands/arms segmentation scheme.

Accordingly, the problem of hands/arms miss detection when these ones are stopped remains unresolved. In FIG. 5 we can see the global architecture of the skin-motion segmentation.

Hand and Arm Detection, 75

Even with the filtering in steps 71, 72 and 73 some erroneous regions can still exist. The largest blobs in the scene are analysed to find regions that may be arms and hands. The shape parameters of the blobs: size, major versus minor axis, and angle of major and minor axes are used to identify the hands and arms.

Hands Joined Decision, 76

By analysing the shape parameters of the hand and arm blobs a decision can be made about whether the hands are joined in a rubbing motion.

High Risk Gesture Recognition, 77

If the hands are not joined the system tries to determine if the hands have gone near the taps. This would be a high risk gesture but only if it occurs at the end of the hand wash cycle.

Monitoring hand motions during washing is important to ensure the cleanliness of hands. However it is also important to prevent contamination of the hands at the end of hand washing because the hands rather than an elbow were used to turn off the water supply. These actions must also be interpreted in context as it is hygienic to use the hands at the start of hand washing to turn on the water but not hygienic to do so at the end of hand washing. Thus the detection of the actions is separate to the classification of the risk behaviour.

Reaction of Interest Calculation, 78

Based on the location of the hands within the image a region of interest around the hands is created.

Figure 6:
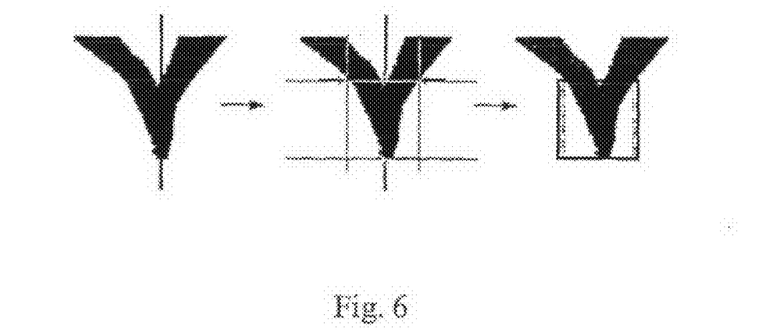
FIG. 6 shows hand ROI selection.

Once the hands and the arms are segmented the processor applies a simple connected components analysis over the binary image, removing small area components. Then, a region of interest covering the hands is selected. The vertical symmetry axis is used for computing upper and lower boundaries, which are then used for computing lateral ones. This process is depicted in FIG. 6.

The region of interest should be square sized in order to keep a constant size and not distort the hands pose. Sometimes, the processor enlarges the width or the height to obtain a square region of interest. Then it resizes the ROI to a fixed size of 128×128 where features will be subsequently extracted. Sometimes the range of hand sizes, large hands, small hands, and the position of the hands, i.e. close to the camera, or far from the camera change the size of the hands in the image. To compensate for these scale changes the processor passes multiple ROIs to the feature extraction system e.g. 128×128, 64×64, 32×32. Extracting features across a range of scales makes the classification more tolerant to different sizes of hands in the image.

Feature Extraction, 79

Using algorithms such as the histograms of optical flows, histograms of orientation gradients, or reduced scale images of the hands, the system extracts information and measurements from the images.

Figure 7:
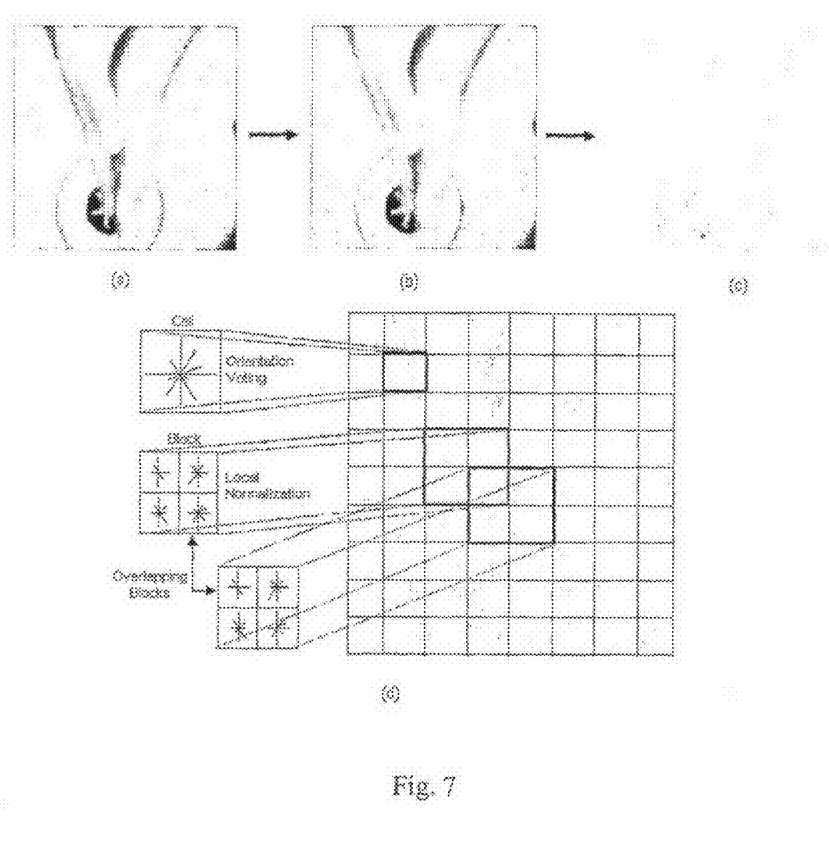
FIG. 7 shows HOG description, (a) original image, (b) gray image, (c) gradient image, (d) HOG cells distribution and blocks normalization.

Choosing discriminating and independent features is important to pattern recognition being successful in classification. Where the processor uses local Histograms of Oriented Gradients (HOG) as a single frame feature extraction method, the aim of this method is to describe an image by a set of local histograms. These histograms count occurrences of gradient orientation in a local part of the image. First the gradient image is computed. Then the image is split in cells which can be defined as a spatial region like a square with a predefined size in pixels. For each cell, the processor computes the histogram of gradients by accumulating votes into bins for each orientation. Votes are weighted by the magnitude of a gradient, so that the histogram takes into account the importance of gradient at a given point.

When all histograms have been computed for each cell, the processor builds the descriptor vector of an image, concatenating all histograms in a single vector. However, due to the variability in the images, it is necessary to normalize cell histograms. Cell histograms are locally normalized according to values of the neighboured cell histograms. The normalization is done among a group of cells, which is called a block. A normalization factor is then computed over the block and all histograms within this block are normalized according to this normalization factor. Once this normalization step has been performed, all the histograms can be concatenated in a single feature vector. We use the L2-norm scheme:

$$v \to \frac{v}{\sqrt{\|v\|_2^2 + \epsilon}} \quad (10)$$

Where $\epsilon$ is a small regularization constant needed because sometimes empty gradients are going to be evaluated. According to how each block has been built, a histogram from a given cell can be involved in several block normalization. Thus, there is some redundant information which improves the performance. This method is illustrated in FIG. 7.

In order to compute the vector dimension several parameters have to be taken into account: ROI dimension, cell size, block size, number of bins, and number of overlapped blocks. The ROI size is 128×128, each window is divided into cells of size 16×16 and each group of 2×2 cells is integrated into a block in a sliding fashion, so blocks overlap with each other. Each cell consists of a 16-bin Histogram of Oriented Gradient (HOG) and each block contains a concatenated vector of all its cells. Each block is thus represented by a 64 feature vector which is normalized to an L2 unit length. Each 128×128 region of interest is represented by:

$$\text{Cells}_{Row} = \text{ROI}_{Width}/\text{cells}_{Width} \quad (11)$$

$$\text{Cells}_{Column} = \text{ROI}_{Height}/\text{cells}_{Height} \quad (12)$$

$$\text{CellsBlock}_{Row} = \text{block}_{Width}/\text{cells}_{Width} \quad (13)$$

$$\text{CellsBlock}_{Column} = \text{block}_{Height}/\text{cells}_{Height} \quad (14)$$

$$\text{OverlapBlocks}_{Row} = \text{Cells}_{Row} - \text{CellsBlock}_{Row} + 1 \quad (15)$$

$$\text{OverlapBlocks}_{Column} = \text{Cells}_{Column} - \text{CellsBlock}_{Column} + 1 \quad (16)$$

$$\text{VectorDIM} = \text{OverlapBlocks}_{Row} * \text{OverlapBlocks}_{Column} * \quad (17)$$

$$\text{CellsBlock}_{Row} * \text{CellsBlock}_{Column} * \text{bins}_{HOG} \quad (18)$$

Thus, the feature vectors are of 3,136 dimension.

Figure 8:
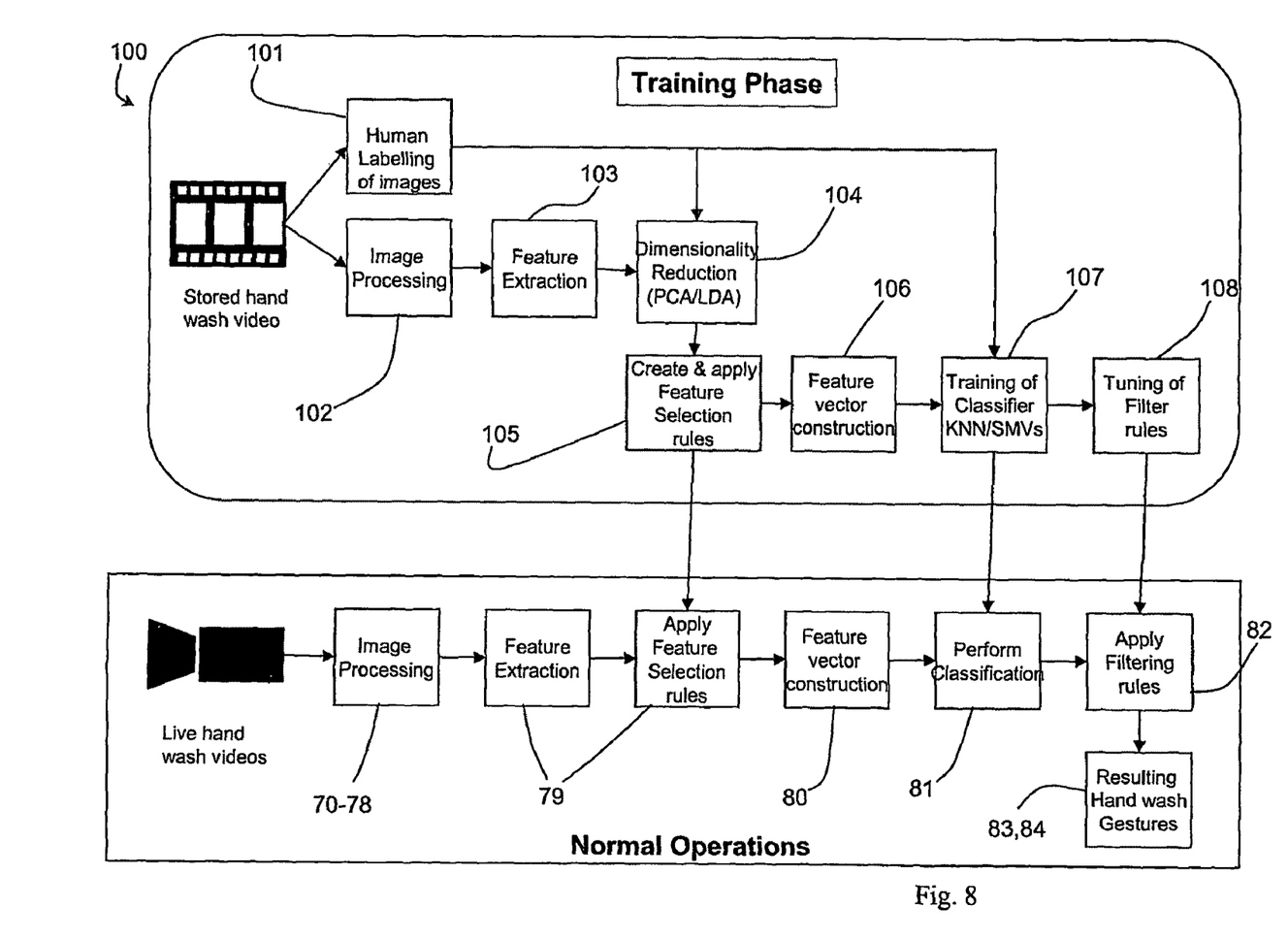
FIG. 8 is a flow diagram showing training to generate feature selection rules, and performance of feature selection during operation of the system.

Referring to FIG. 8 in a training phase the system uses stored videos of gestures previously identified by human observers. This information is used to select the relevant features, train the classifier and tune the filters. In a second phase, "normal operations", the system executes the image processing, feature extraction, feature selection, classification and filtering operations.

Referring to FIG. 3, the training phase includes:
101, human labelling of images,
102, image processing of the stored video,
103, feature extraction,
104, dimensionality reduction,
105, creating and applying feature selection rules,
106, constructing a feature vector,
107, training a classifier, and
108, tuning the filter rules In the training phase the full set of features are generated using histogram of Orientation Gradients, or histogram of flows (or "spatio-temporal motion"). This generates a large number of features not all of which are contributing positively to the classification. The dimensionality of the feature set is reduced to identify and use only that sub-set of the features which contribute most to the classification of the hand motions. Mathematical techniques such as Principal Components Analysis or Linear Discriminant Analysis are used to identify this subset of features. This process is called feature selection. The subset of features to be used, typically about 10% of the original set, is passed to the classifier. The classifier learns to associate the features with the motion patterns and thus identifies the hand motions used in hand washing. The final stage of training is to tune the filters that detect and correct errors of classification by examining the sequence of hand motions along with the underlying prior probabilities of the hand poses. Mathematical structures such as Kalman filters, Bayesian networks or Markov decision processes are used to implement these filters.

In the normal operations phase the image processing filters are applied, regions of interest (ROI) are identified and the feature extraction algorithms are run. A subset of the features are selected according to the prior training and concatenated to form a feature vector. This feature vector is passed to the classifier that determines which of the hand motion is currently in use. This result is filtered to remove errors resulting in the final hand motion classification.

Build Feature Vectors, 80

An array of the measurements suitable for classification are made and only those measurements which contribute most to the classification are used. The measurements from the feature extraction algorithms are combined to create an array called a feature vector, and this could contain over 3000 different measurements.

Two approaches to feature vector building are processing histograms of edge orientation, and processing histograms of spatio-temporal motion.

Where histograms of flows are used to create a feature vector using the spatio-temporal information a region of interest around the hands and arms is created and dense motion vectors are extracted. The image is divided into cells and the histograms of the motion vector directions are calculated. The histograms from several subsequent frames may also be added to calculate the motion direction histogram over a sequence of frames. The histograms are normalised either globally or in overlapping local neighbourhoods. The resulting histograms are combined to form a feature vector that is passed to the multi-class classifier. This is described in more detail above.

In order to reduce the dimensionality of the feature vectors the processor analyses the variance in the feature vector using Principal Components Analysis (PCA). This helps the processor 5 to identify which feature measurements are contributing most to a correct classification. The processor keeps only those features which contribute most to the correct classification; this could typically be only 10% of our original features.

Also, in another embodiment a data reduction technique other than PCA is used, such as linear discriminate analysis (LDA), particularly Fischer LDA. Using smaller and better clustered data sets can allow the use of a simple K-nearest neighbour classifier that can be implemented easily in hardware.

Classification, 81

The feature vector is passed to a multi-class classifier to produce an estimate of the current hand pose. In situations where there is little noise (good lighting, non-specular sinks) a simple classifier such a KNN (K nearest neighbour, or "supervised K means") can be used. If a more complex and general classification problem exists an ensemble of Support Vector Machine or a Cascade of Weak Classifiers can be used.

A multi-class classification system is trained using exemplar feature vectors to produce reliable classifications, a computationally efficient structure and one which generalises well to the wide variety of hand shapes, sizes and bi-manual configurations. One such approach is to use an ensemble of support vector machines. Several strategies may be used to perform this type of ensemble classification. One such strategy is to train an individual support vector machine to classify one pose against a different pose. Multiple support vector machines are trained to cover all possible combinations. The results of the different support vector machines can be combined using a voting scheme with the pose which has the highest number of votes being selected as the correct pose.

In more detail, the Support Vector Machine classifier is a binary classifier algorithm that looks for an optimal hyperplane as a decision function in a high dimensional space. It is a kind of example based machine learning method for both classification and regression problems. This technique has several features that make it particularly attractive. Traditional training techniques for classifiers, such as multi-layer perceptrons (MLP) use empirical risk minimisation and only guarantee minimum error over the training set. In contrast, SVM based on the structural risk minimisation principle minimise a bound on the generalization error and therefore perform better on novel data.

Thus, consider one has a training data set $\{x_k, y_k\} \in \chi \times \{-1, 1\}$, where $x_k$ are the training examples (feature vectors) and $y_k$ the class label. At first, the method consists in mapping xk in a high dimensional space owing to a function $\phi$. Then, it looks for a decision function of the form: $f(x) = w \cdot \phi(x) + b$ and $f(x)$ is optimal in the sense that maximizes the distance between the nearest point $\phi(xi)$ and the hyperplane. The class label of x is then obtained by considering the sign of $f(x)$.

This optimization problem can be tuned, in the case of soft-margin SVM classifier (misclassified examples are linearly penalized), in the following way:

$$\min_{w,\xi} \frac{1}{2}\|w\|^2 + C\sum_{k=1}^{m} \xi_k \qquad (19)$$

under the constraint $\forall k, y_k f(x_k) \geq 1 - \xi_k$. The solution of this problem is obtained using the Lagrangian theory and it is possible to show that the vector w is of the form:

$$w = \sum_{k=1}^{m} \alpha_k^* y_k \phi(x_k) \qquad (20)$$

where $\alpha^*_k$ is the solution of the following quadratic optimization problem:

$$\max_{\alpha} W(\alpha) = \sum_{k=1}^{m} \alpha_k - \frac{1}{2}\sum_{k,l}^{m} \alpha_k \alpha_l y_k y_l K(x_k, x_l) \qquad (21)$$

subject to $$\sum_{k=1}^{m} y_k \alpha_k = 0$$

and $\forall k, 0 \leq \alpha_k \leq C$, where $K(x_k, x_l) = (\phi(x_k), \phi(x_l))$. $K(x_k, x_l)$ is called the kernel function. Even though new kernels are being proposed by researchers, beginners may find in SVM books the following four basic kernels:

linear: $K(x_i,x_j)=x_i^T x_j$.

polynomial: $K(x_i,x_j)=(\gamma x_i^T x_j+r)^d, \gamma>0$.

radial basis function (RBF): $K(x_i,x_j)=\exp(\gamma\|x_i-x_j\|^2)$, $\gamma>0$.

sigmoid: $K(x_i,x_j)=\tan h(\gamma x_i^T x_j+r)$ where γ, r and d are kernel parameters.

The LIBSVM library is used for training and test. The RBF kernel non-linear maps samples into a higher dimensional space, so it, unlike the linear kernel can handle the case when the relation between class labels and attributes is nonlinear. The second reason is the number of hyper-parameters which influences the complexity of the model since polynomial kernel has more hyper-parameters than the RBF kernel. In addition RBF kernel has less numerical difficulties.

In order to perform the multi-class classification the "one against one" method is used, in which k(k−1)/2 (with k=7 we have 21 classifiers) different binary classifiers are constructed and each one trains data from two different classes. In practice "one against one" method is one of the more suitable strategies for multi-classification problems [14]. After training data from the ith and the j th classes, the following voting strategy is used: if $\text{sign}((w^{ij})_T\phi(x)+b^{ij})$ says x is in the ith class, then the vote for the ith is added by one. Otherwise the j th is increased by one. Then x is predicted to be in the class with the largest vote. This approach is usually referred as the "max wins" strategy. In case that two classes have identical votes, the decision values (distance to the decision surface) of each one of the classifications is taken into account as in.

Pose Filtering, 82

The bimanual hand poses are represented as a table of transitions from prior poses with probabilities assigned. For example, if the current pose is B and the previous was E, then the likelihood of this transition is 80%. All prior and current poses are assigned poses based on training and analysis. Low probability poses are deleted as they are likely to be the result of misclassification.

The use of a post classification filter allows for a small and efficient classifier to be used. Occasional classification errors are caught and rectified based on a probabilistic model of hand position reachability. For example, it is unlikely that hands may move immediately from pose A to pose F without some transition pose. It is therefore more likely that pose F is in fact a misclassification and the filter assigns the most likely transition pose. Filters operate on multiple time intervals; frame-to-frame transitions and weighted averages over several frame intervals to produce a reliable sequence of hand pose classifications to the hand motion analysis system.

Time and Motion Analysis, 83

Poses which are sustained for a threshold number of frames (e.g. 3) are passed to an accumulator which counts the number of frames that each pose has been maintained for, which effectively counts the amount of time spent in each pose. Each pose has a configurable threshold minimum time. When all thresholds are exceeded the hands are deemed to have been washed to a sufficiently high standard.

The hand pose information is used to complete a hand hygiene assessment. Each of the hand poses must be recorded for a configurable time period. Bi-manual hand washing poses can be executed in any order. This information is integrated over time and provided to the user via a graphical display such as a speaker or an audio display device. Site-specific options can be implemented regarding overall hand washing metrics such as total time and critical versus non critical hand poses.

The system 1 displays on the simple low-power display 6 permanent graphics of the individual hand poses. The display is a low power LCD display. This indicates to the user that each pose has been achieved. The graphics can be easily customised for each installation.

The system must deal with the challenges posed by changing lighting. A typical scenario is where a hand washing facility is positioned where there is a mix of natural and artificial lighting. Each of these light sources cause colour casts in the image and depending on the time of day the proportions of artificial and natural light can vary significantly. Because the detection of the hands is a significant issue and uses colour as a significant feature algorithms have been developed to calibrate for colour changes. These are contained within an image normalisation process.

Many hand wash stations are high reflective, particularly stainless steel wash hand basins. Basing the segmentation of the hands purely on colour information can lead to significant false positives as the colour of the hands are reflected in the specular surface. By segmenting based on a combination of colour, texture and motion the specular reflections in the typical hand wash station it is possible to achieve reliable segmentation.

When colour and texture are used to segment hands and arms from the background, personal jewelry such as watches and rings often result in small disconnected regions being created. Typically, small regions are also created due to background segmentation errors. Small regions would normally be deleted based on a size filter. However shape analysis of the region boundary is also used to assess if the small region is due to a background segmentation error or a personal jewelry item. The signature shape that is used is if the two shapes on either side of the split share a narrow parallel boundary and in addition the colour and texture on either side of the divide are identical. If this is the case the regions are merged.

Results

Supervised Training and Test

A supervised labeling process is used for generating training and test data sets. Firstly a database with ROI images and their labels is generated. Thus the reuse of the database is assured. Secondly an off-line application computes the feature vectors for both training and test procedures. Once we have one classifier correctly trained we can use it for on-line pose recognition. The number of training and test samples, is depicted in Table 1. We have one class for each one of the different poses of the recommended hand washing procedure.

TABLE 1

Class distribution of the training and test data sets

| Data sets | Pose 1 | Pose 2 | Pose 3 | Pose 4 | Pose 5 | Pose 6 | Others |
|---|---|---|---|---|---|---|---|
| Training Data Set | 638 | 780 | 594 | 977 | 902 | 1073 | 587 |
| Test Data Set | 488 | 414 | 360 | 456 | 477 | 358 | 304 |

We can see the results after applying multi-classification with HOG features and SVM classifier in Table 2. These are single frame results which means that they are not filtered in a post-processing stage. Although detection rate is low for the "other poses" case, which is reasonable taking into account that it is the class with higher variability, all the recommended poses are classified with detection rates greater than 85%. Three of them are classified with accuracy greater than 91%, and the best classified class has a detection rate of 96.09%. A multi-frame validation process would improve these results by far.

TABLE 2

Detection Rate for the different classes

| | Pose 1 | Pose 2 | Pose 3 | Pose 4 | Pose 5 | Pose 6 | Others |
|---|---|---|---|---|---|---|---|
| Detection Rate | 86.07% | 91.55% | 94.72% | 89.25% | 86.37% | 96.09% | 61.84% |

Figure 9:
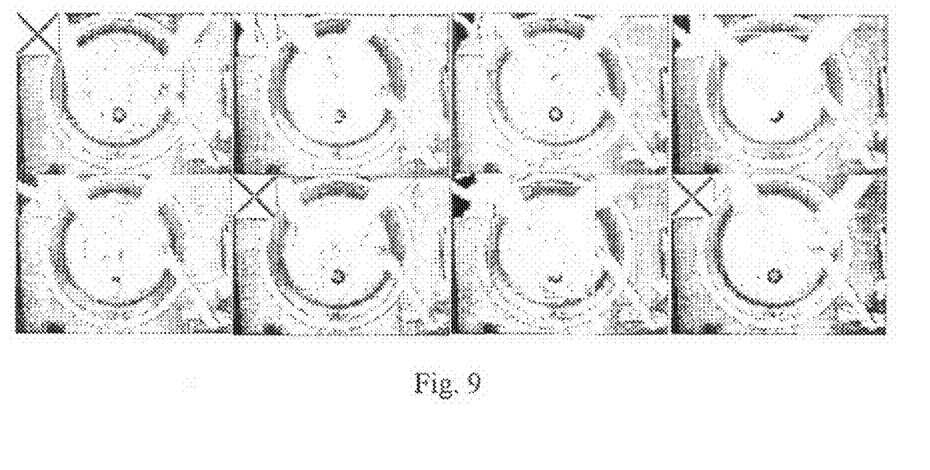
FIG. 9 shows single frame classification results in a sequence.

FIG. 9 depicts the single flame classification results in a sequence. The detected class is shown with a picture at the top left of the image. The system correctly detects when the hands are separated or joined. Even with a single frame approach the classifier correctly detects the transitions between poses, which are classified as other poses class. Second, fifth and sixth poses are correctly classified in both cases: when the left hand is rubbing the right one and vice versa.

Figure 10:
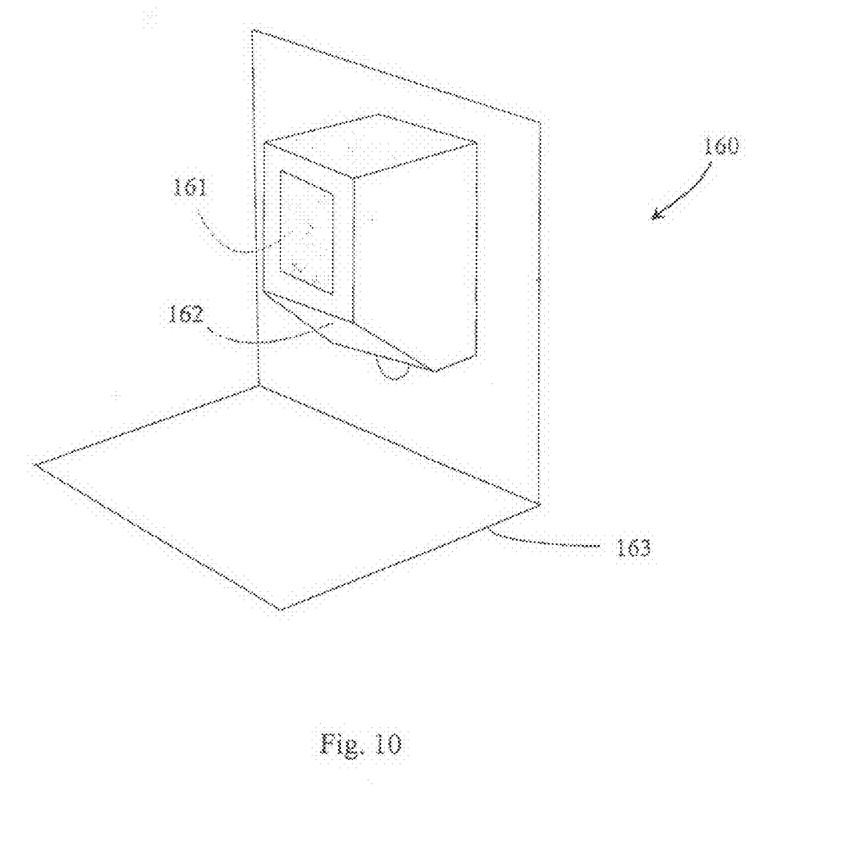
FIG. 10 is a perspective view of a stand-alone battery-operated sensor head of an alternative monitoring system.

Referring to FIG. 10 another system, 160, is illustrated. The system 160 comprises a housing 161 with a camera window 162 facing towards a sink unit. A processor is contained within the housing, and the system is battery powered. A background plate 163 extends outwardly.

By implementing a system based on a cascade of efficient but error-prone segmentation and classification methods an overall highly reliable performance is achieved. This allows the system to be implemented on low cost and low power computer hardware. The resulting system can operate on a battery and could be integrated into a replaceable soap dispensing unit.

The system can provide the hand washing data to an on-system storage device or can be broadcast via a wireless link to central data storage. In either case the records can for part of a HACCP (Hazard Analysis and Critical Control Points) records for use in food preparation or other hygiene standards.

The invention is not limited to the embodiments described but may be varied in construction and detail.

The invention claimed is:

1. A hand washing monitoring system comprising a camera, a processor, the processor being adapted to receive from the camera images of hand washing activity, characterized in that, the processor is adapted to:
   analyse mutual motion of hands to determine if the hands mutually move in desired poses, and if so, the durations of the patterns; and
   generate a hand washing quality indication according to the analysis.

2. The monitoring system as claimed in claim 1, wherein the processor analyses the images within a region of interest encompassing joined hands.

3. The monitoring system as claimed in claim 1, wherein the processor generates the indication independently of the order of motion poses.

4. The monitoring system as claimed in claim 1, wherein the processor is calibrated for light level and/or colour changes in an image normalisation process.

5. The monitoring system as claimed in claim 1, wherein the system is battery powered.

6. The monitoring system as claimed in claim 1, wherein the processor executes a lighting compensation filter operating on the basis that the spatial average of surface reflectance in a scene is achromatic.

7. A soap dispensing unit comprising a monitoring system as claimed claim 1.

8. A computer readable medium comprising software code for performing operations of a processor of a monitoring system as claimed in claim 1.

9. The monitoring system as claimed in claim 1, wherein the processor determines a time duration for a pose by registering a count of the number of image frames for a pose.

10. The monitoring system as claimed in claim 9, wherein the processor assigns a minimum threshold for each pose.

11. The monitoring system as claimed in claim 1, wherein the processor performs segmentation according to colour, texture and/or motion to avoid noise arising from reflections.

12. The monitoring system as claimed in claim 11, wherein the processor eliminates pixels representing watches or jewellery according to region size and shape analysis.

13. The monitoring system as claimed in claim 1, wherein the processor extracts information features from the images and generates feature vectors based on the features, including bimanual hand and arm shape vectors, and executes a classifier with the vectors to determine the poses.

14. The monitoring system as claimed in claim 13, wherein the processor uses edge segmentation to form at least some of the feature vectors.

15. The monitoring system as claimed in claim 13, wherein the processor uses pixel spatio-temporal measurements to form at least some of the feature vectors.

16. The monitoring system as claimed in claim 13, wherein the processor decomposes an image into cells and uses each cell to calculate a histogram, and combines the histograms to form a feature vector.

17. The monitoring system as claimed claim 13, wherein the processor generates the feature vectors using rules derived from a training phase performed with reference images.

18. The monitoring system as claimed in claim 13, wherein the processor classifies the feature vectors by executing a multi-class classifier which is trained with exemplar feature vectors to generate an estimate of a hand pose.

19. The monitoring system as claimed in claim 13, wherein the processor performs the classification using a support vector machine.

20. The monitoring system as claimed in claim 19, wherein the processor executes an ensemble of support vector machines.

21. The monitoring system as claimed in claim 19, wherein the processor executes an ensemble of support vector machines; and wherein the processor determines a pose according to votes from different support vector machines.

22. The monitoring system as claimed in claim 13, wherein the processor uses edge segmentation to form at least some of the feature vectors; and wherein the processor filters bimanual hand pose classifications.

23. The monitoring system as claimed in claim 13, wherein the processor uses edge segmentation to form at least some of the feature vectors; and wherein the processor filters bimanual hand pose classifications; and wherein the processor performs said filtering by using probabilistic bimanual hand motion models to remove anomalous results.

24. The monitoring system as claimed in claim 13, wherein the classifier comprises an ensemble of weak classifiers.

25. The monitoring system as claimed in claim 13, wherein the processor performs feature extraction by generating histograms of gradient orientation in a local part of an image by accumulating votes into each of a plurality of bins, each for an orientation; and wherein the processor generates a gradient orientation histogram for each of a plurality of pixel cells comprising pre-defined numbers of pixels; and wherein the processor concentrates all histograms into a single vector.

26. A monitoring system as claimed in claim 13, wherein the processor performs feature extraction by generating histograms of gradient orientation in a local part of an image by accumulating votes into each of a plurality of bins, each for an orientation; and wherein the processor generates a gradient orientation histogram for each of a plurality of pixel cells comprising pre-defined numbers of pixels; and wherein the processor concentrates all histograms into a single vector; and wherein the processor normalizes cell histograms.

27. A monitoring system as claimed in claim 13, wherein the processor performs feature extraction by generating histograms of gradient orientation in a local part of an image by accumulating votes into each of a plurality of bins, each for an orientation; and wherein the processor generates a gradient orientation histogram for each of a plurality of pixel cells comprising pre-defined numbers of pixels; and wherein the processor concentrates all histograms into a single vector; and wherein the processor normalizes cell histograms; and wherein the processor performs a training phase in which vectors are generated from training images.

28. The monitoring system as claimed in claim 13, wherein the processor performs feature extraction by generating histograms of gradient orientation in a local part of an image by accumulating votes into each of a plurality of bins, each for an orientation.

29. The monitoring system as claimed in claim 28, wherein the processor generates a gradient orientation histogram for each of a plurality of pixel cells comprising pre-defined numbers of pixels.

30. The monitoring system as claimed in claim 13, wherein the processor reduces size of the feature vectors.

31. The monitoring system as claimed in claim 30, wherein the processor reduces feature vector size using Principal Component Analysis.

32. The monitoring system as claimed in claim 30, wherein the processor uses linear discriminate analysis to reduce feature vector size.

33. The monitoring system as claimed in claim 30, wherein a self-organising map is generated to represent clustered datasets of a reduced feature vector.

34. The monitoring system as claimed in claim 13 wherein the processor, before feature extraction, detects skin by normalizing pixel colour values to skin and non-skin class bins, and processes bin counts to determine skin probability values.

35. The monitoring system as claimed in claim 34, wherein the processor performs optical flow calculations based on pixel distance moved and direction of movement, and applies motion data to a filter to eliminate skin false-positive pixels.

36. The monitoring system as claimed in claim 34, wherein the processor performs optical flow calculations based on pixel distance moved and direction of movement, and applies motion data to a filter to eliminate skin false-positive pixels; wherein the processor determines increase and decrease factors representing pixel motion increase and decrease, and applies a greater weighting to motion than absence of motion.

37. The monitoring system as claimed in claim 34, wherein the processor performs hand and arm detection by monitoring geometric characteristics of pixel blobs, including major and minor axes.

* * * * *